Patented Jan. 7, 1941

2,227,432

UNITED STATES PATENT OFFICE 2,227,432

WATER PURIFICATION

Abraham Sidney Behrman, Chicago, and Hilding B. Gustafson, La Grange, Ill., assignors to International Filter Co., Chicago, Ill., a corporation of Delaware No Drawing. Application March 14, 1938, Serial No. 195,824

11 Claims. (Cl. 210—23)

This invention relates to a process for removing fluorine from water, particularly from drinking water.

In the last few years it has been established that an excessive fluorine content in drinking water supplies is responsible for the diseased dental condition commonly called "mottled enamel." The raw water supplies of large areas contain up to 3 parts per million of fluorine, and in other localities water may contain even 10 parts per million or more. At the present time it is considered desirable to keep the fluorine content of potable water not in excess of 1.0 parts per million; and a still lower permissible maximum may be established in the future, as the result of further investigation.

A number of methods for removing fluorine from water have been suggested. It has been proposed, for example, to use a freezing process to separate the fluorine, to precipitate it with the help of certain reagents, and to adsorb it by activated carbon or activated alumina. Except under very specific conditions, however, most of these methods are impractical because when applied on a plant scale they usually are excessively expensive. In some cases they require that the water be treated at an extremely low or high pH, which may be quite undesirable; in others, the results are unreliable, inconsistent, or of too short duration.

The most satisfactory and generally applicable method of fluorine removal thus far described depends on the ability of the alkaline earth phosphates to extract fluorine from aqueous solution. The exact mechanism of the separation is not known, although it is presumably some type of adsorption, or chemical reaction, or both. Details of a process of fluorine removal of this kind are described by Adler, Klein and Lindsay, in "Industrial and engineering chemistry," vol. 30, pages 163 to 165 (1938). In the preferred modification of the process, the article refers to the use of an especially prepared, highly porous and reactive granular form of tricalcium phosphate which is utilized in a bed through which the raw water is passed, much as in a zeolite softener or other contact filter. Passage of the raw water through the bed of granular tricalcium phosphate, under prescribed operating conditions, results in the required degree of fluorine removal. After a certain amount of fluorine has been removed, the bed becomes exhausted. It can then be regenerated by treating the bed with a solution of an alkali, such as caustic soda, which in turn removes from the bed the fluorine taken up from the water. The excess alkali in the bed is removed in part by washing with water; the remainder of the alkali, which is retained so tenaciously by the bed as to make complete elimination by washing with water an extremely lengthy and expensive procedure, is neutralized by washing the bed with a solution of an acid, preferably hydrochloric acid, to convert the residual alkali to a salt (e. g. sodium chloride) which can be very quickly removed from the bed by washing with a relatively small quantity of water. The neutralizing acid solution is supplied in an amount roughly equivalent to the residual alkali. Following the acid wash and subsequent water wash, the bed is in condition to remove further quantities of fluorine from fresh portions of the raw water.

The process as described gives excellent results in fluorine removal; and it is free from many of the limitations of other processes that have been suggested. However, the authors report that the use of hydrochloric acid for the neutralization of the residual alkali results in a loss of tricalcium phosphate amounting to 2 to 3 per cent of the material per regeneration, which, while not important in the treatment of the drinking water supply of a single household, constitutes a very substantial operating charge in large scale use. The process has been found by the present inventors to possess certain other serious defects, which, unless remedied, will lessen materially the field of usefulness of the process. Chief among these defects may be mentioned the rather rapid deterioration of the fluorine-removal capacity of the tricalcium phosphate even apart from and in addition to the loss of material per regeneration. Another defect, possibly associated with the one just mentioned, is the gradual decrease in porosity and increase in density and particle size of the residual tricalcium phosphate, making it necessary to employ a much higher rate of flow for backwashing the old portion of a bed than for the new portion that has been added recently to make up for losses incurred in regeneration. Another undesirable and expensive feature of the present process is that the bed of tricalcium phosphate must be contained in an acid-proof container, and that piping and other auxiliaries with which the hydrochloric acid solution comes in contact must likewise be constructed of acid-proof material. As is well known to every chemist and engineer, the problem thus introduced is a very serious one, as the number of materials of construction which will permanently withstand the effect of a solution of hydrochloric acid, as well as of caustic soda, is extremely limited.

It is thus the general object of the present invention to provide an improved process for removing fluorine from water by means of tricalcium phosphate, remedying the defects in the existing process as above described.

A specific object of the invention is to provide a process for fluorine removal by this method which will permit cyclic operation and regeneration over long periods without deterioration of the fluorine-removal capacity of the tricalcium phosphate.

A further object of the invention is to provide an improved method of regeneration which will avoid any appreciable loss of the tricalcium phosphate per regeneration.

A still further object is to provide an improved method of regeneration which will avoid any substantial change in the porosity or density of the tricalcium phosphate.

Another object of the invention is to make possible the employment of common, inexpensive materials of construction for the apparatus in which the process is carried out.

The manner in which these and other objects of the invention are accomplished will become apparent on the further reading of this specification and of the claims.

Briefly stated, we have made the surprising discovery that, if carbon dioxide is employed instead of the hydrochloric or similar acid previously utilized in the regeneration of the exhausted tricalcium phosphate to neutralize the excess residual alkali, there is no deterioration of fluorine-removal capacity of the tricalcium phosphate per unit volume, even after a large number of cycles of operation and regeneration. Furthermore, there is no appreciable decrease in the volume of tricalcium phosphate, even after a great many cycles. The vital importance of the two improvements just mentioned on the economy and efficiency of the process will be at once apparent; and these two new and unexpected results alone so change the picture of fluorine removal by this process, especially on a large scale, that the field of usefulness of the method will undoubtedly be widely expanded in consequence. Another practical operating benefit of the improved process is that the porosity, density, and particle size of the tricalcium phosphate remain substantially unchanged, thus avoiding the problem of changing rates of backwash required by the previous method. Finally, the improved process makes possible the employment of ordinary and inexpensive materials of construction and simple design of equipment, whereas the previous process, employing hydrochloric or similar acid, required the use of highly resistant materials such as hard rubber, rubber-lined steel, or chemical stoneware.

For the purpose of exemplification and comparison, we shall first describe briefly the results of a series of long-time tests carried out with the process as described by Adler, Klein and Lindsay, and shall then give the results of a comparable series of tests with the improved process forming the subject of the present invention.

In both series of tests the water employed was Chicago tap water to which had been added sufficient sodium fluoride to give the desired concentration of fluorine (usually either 5 or 10 parts per million). This water was then passed downwardly through a bed, 10 inches in depth, of the special granular tricalcium phosphate previously described, screened approximately 20 to 40 mesh. The rate of flow was approximately 1 gallon per square foot per minute. Since even the most rapid method of determining fluorine in water requires several hours, it was necessary to ascertain by experiment and frequent sampling the length of the purification run—that is, when the fluorine content of the effluent water began to exceed the permissible limit of 1.0 parts per million. It was thus eventually found that the capacity and operating conditions could be so related and adjusted as to produce a purification run of 12 hours, after which regeneration of the bed was necessary.

In the first series of tests regeneration was carried out with the caustic soda and hydrochloric acid solutions described in the paper referred to. The bed of tricalcium phosphate was thoroughly backwashed before applying the caustic soda solution. The concentration of the caustic soda solution was 1.2 per cent, the volume of solution employed was equivalent to 11 gallons per cubic foot of the tricalcium phosphate, and the time of passage of the solution downward through the bed was 15 minutes. This was followed by a water wash of the same volume for 15 minutes, then by the same volume of 0.7 per cent hydrochloric acid, also in 15 minutes, and finally by a water wash at the operating rate of flow until the amount of chloride in the effluent water was approximately the same as in the influent, at which point the purification run was started.

An average loss of 2 per cent of the tricalcium phosphate was noted per regeneration. At the end of every five runs, the loss was made up with fresh material, in order not to decrease the depth of bed undesirably.

At the end of some 25 to 35 such cycles, it was observed that the fluorine-removal capacity of the bed had become practically exhausted, and could not be restored by the regeneration treatment. A new bed was installed, the tests were repeated under identical conditions, and the same result was secured—that is, at the end of only the small number of cycles indicated, the material was exhausted and could not be regenerated successfully.

It was at once evident that, if the behavior of the tricalcium phosphate noted above was typical, the actual loss of the tricalcium phosphate would not be the previously estimated 2 to 3 per cent, but would actually be nearer 6 per cent, which would make the expense of treatment by this method so great as to be in many cases prohibitive.

When portions of the two exhausted beds were carefully examined, it was found most surprisingly that the bulk density of the material had increased from its original value of about 35 pounds per cubic foot to about 68 pounds per cubic foot, and that the original porosity of 72 per cent had decreased to about 45 per cent. The average particle size of the spent material was appreciably greater than of the original. Obviously, this increase in particle size and the great increase in density of the material would make necessary a much higher rate of flow for proper backwash.

Whatever the cause of the premature exhaustion of, and concomitant changes in, the tricalcium phosphate above described, all these undesirable effects are eliminated by the use of our invention, which comprises essentially the utilization of carbon dioxide in place of hydrochloric acid in the method of regeneration previously described. The carbon dioxide is preferably supplied in an amount sufficient to convert the residual alkali to sodium bicarbonate, which may be quickly washed from the bed with a relatively small quantity of water; and we have found that even a slight excess of carbon dioxide beyond the amount theoretically required may be employed advantageously.

There are two principal types of methods possible for applying the carbon dioxide. One is to bubble the gas upward through the submerged bed of tricalcium phosphate through an appropriate distributor system, such as a pipe grid, porous plates or the like. The other method is to dissolve the carbon dioxide in water and apply the resulting solution to the bed. In either case, one may employ either pure carbon dioxide or a mixture of gases, such as that resulting from the combustion of a carbonaceous fuel, in which carbon dioxide is an important component. In the series of tests about to be described, we employed an aqueous solution of carbon dioxide, preparing this solution by passing carbon dioxide from a cylinder of the compressed gas into water. The solution was employed in a concentration of 1.5 grams carbon dioxide per liter of solution. This series of tests was carried out under conditions strictly comparable with those employed in the previous series, making only such changes in the mechanics of the regeneration step as observation indicated would be desirable in view of the employment of carbon dioxide instead of hydrochloric acid. Thus, as before, the equivalent of 11 gallons of 1.2 per cent caustic soda solution was employed per cubic foot of tricalcium phosphate, this volume of solution being put through the bed in 15 minutes. This application was followed by a water wash of from 11 to 22 gallons per cubic foot, and then by 33 gallons of the carbon dioxide solution containing 1.5 grams carbon dioxide per liter. Further washing with water was then continued at the operating rate of flow until the alkalinity of the effluent water was only slightly in excess of that of the influent, at which point the purification run was started.

Using the improved method of regeneration just described, the tests were continued until a total number of 100 cycles had been performed. During the first 50 runs, samples of treated water were taken for test during every fifth run, and subsequently during every tenth run, in order to determine accurately the behavior of the bed as far as fluorine-removal capacity and other characteristics were concerned.

At the end of 100 cycles, the following highly gratifying state of affairs prevailed: (1) The original volume of the tricalcium phosphate was in no wise diminished; since there had been no loss, there was obviously no need for replacement, (2) The fluorine-removal capacity of the bed was unchanged; as far as could be observed, the bed was in just as good condition as when new, and was capable of further use for an indefinite number of cycles of purification and regeneration. (3) No apparent change was noted in the density, porosity, or particle size of the tricalcium phosphate granules, nor in the backwash rate required to loosen and cleanse the bed.

The contrast between these results and those obtained with the former method of regeneration are so striking in themselves and in their implications that little comment is needed. The loss of tricalcium phosphate per regeneration has been reduced from about 2 per cent to approximately zero. The useful life of the tricalcium phosphate has been increased from twenty-five or thirty cycles to a practically indefinite number, presumably subject only to the imperceptible loss due to attrition which is necessarily characteristic of all contact materials, and which becomes important only after quite a few hundred cycles; and it is worth noting that even a hundred cycles corresponds to a life of two years based on the plan of weekly regeneration which will frequently be employed even in the case of relatively large installations. Similarly, the overall loss of approximately 6 per cent of the tricalcium phosphate per regeneration found with the previous method of regeneration has likewise been apparently reduced to zero; while preservation of the original density, porosity, and particle size of the tricalcium phosphate granules has made possible the maintenance of constant hydraulic operating conditions.

Finally, but far from least in importance, the employment of our improved method of regeneration makes possible the utilization of ordinary materials of construction, such as cast iron, steel, and concrete, with little or no necessity for protective coating; and if, for any reason, it is desired to use such coatings, they need be of only the simplest and most inexpensive type, such as a coating of paint or enamel. This factor is especially important in the case of pressure units, which will be the type most commonly required for small community installations, where it is usually desired to pump from the source of raw water directly through the purification unit into the distribution system without the necessity of repumping. It should be mentioned here that the pH of the relatively strong solution of carbon dioxide used in the tests above described is of the relatively innocuous value of about 4.7; and the pH will be even higher than this in the case of the more dilute solutions prepared from combustion gases.

The preparation of the carbon dioxide solution required is a simple matter when the gas is used in pure form, as from a cylinder of the compressed gas. Due to the ready solubility of carbon dioxide in water, all that is necessary in preparing such solutions in a continuous manner is to provide a very simple type of mixer or carbonator, which need be nothing more than an eductor tube connected to the throat of a Venturi type tube. A reduction valve, pressure gauge, and flow meter connected to the cylinder of carbon dioxide provide ready means for measuring and controlling the amount of carbon dioxide introduced. The same obviously holds true if the carbon dioxide gas is derived from "dry ice." In this case, a convenient method of utilization is to place the solid carbon dioxide in a so-called "liquefier" or "converter," which is simply a pressure vessel capable of withstanding the high gaseous pressure developed when the solid carbon dioxide is placed in a closed container. Current market prices for carbon dioxide in cylinders and in solid form (the latter costing about half as much as the former) will permit the utilization of these two forms of pure carbon dioxide in a great many cases. For very large plants, however, it will frequently be found desirable to produce the carbon dioxide on the spot, such as by the combustion of a carbonaceous fuel, as is practiced regularly for the recarbonation of water softened by the lime-soda process. While any of the common fuels may be employed for this purpose, we prefer in general to use natural or manufactured gas, since it makes possible the utilization of the products of combustion with a minimum of purification and preparation. Since, even under favorable conditions, the highest percentage of carbon dioxide in combustion gases cannot be expected to be much more than 10 to 15 per cent, it is not practicable to prepare a solution of carbon dioxide as strong as if the pure gas had been employed. This means obviously that a larger volume of the more dilute solution will have to be supplied; but this does not necessarily mean a larger total amount of water consumed in the regeneration, since the amount of final wash water will be decreased. Where carbon dioxide is derived from the products of combustion or other dilute mixture, and is to be applied as a solution, a convenient method of preparing this solution is in any convenient form of packed tower, in which water trickles downwardly over the packing and the gas passes upward through it. Where the dilute carbon dioxide mixture is to be bubbled directly upwardly through the submerged bed of tricalcium phosphate, no great loss of efficiency results from the diluted condition of the carbon dioxide, and no special provisions of importance need to be made in consequence. In the latter type of application, a convenient practice to follow is that which has been employed for many years in the "air-washing" of sand filters, supplemented of course by such modifications as are made appropriate by the nature and preparation of the gaseous mixture.

If the conservation of wash water happens to be of sufficient importance, the quantity of wash water may be minimized by recirculating the wash water continuously through a packed tower or equivalent device whereby the wash water is repeatedly charged with fresh quantities of carbon dioxide.

In addition to the sources of carbon dioxide previously mentioned, any other non-toxic supply of this gas, either pure or in admixture, may be utilized. For example, a proposal that has been growing in favor is to recover and calcine the more or less pure precipitate of calcium carbonate formed in the lime-soda process of water softening. In such case not only is there recovered lime, which may be employed for treating further portions of the raw water or for other purposes, but there may also be recovered the carbon dioxide liberated in the course of the calcination. This carbon dioxide may be made to serve two purposes: The first, to "recarbonate" and stabilize the water which has been treated by the lime-soda (or lime) process in the well-known manner; and second, to provide the carbon dioxide required for the regeneration of a tricalcium phosphate fluorine-removal plant to which the lime-soda (or lime) treated water is passed to remove any undesirable fluorine present in the effluent from the softening plant. In a combination treatment plant of this sort, the "recarbonation" of the softened water is desirable not only from the standpoint of stabilization and avoidance of "after-precipitation," but also to lower the pH of the softened water (which may be as high as 10 or 11) in order to increase the efficiency of fluorine removal by the tricalcium phosphate.

A combination treatment plant of the type just described will be found especially valuable in handling certain types of waters which are both quite hard and which contain a large amount of fluorine. It has been shown that appreciable amounts of fluorine may be removed from hard waters containing considerable amounts of magnesium when such waters are treated with lime (or lime and soda) to precipitate the magnesium as magnesium hydroxide. Due, however, to the disproportionately large amounts of magnesium required with increasing fluorine content, it is not generally possible to reduce by this method the fluorine content of a hard water to the permissible maximum when the fluorine content in the raw water exceeds 2 or 3 parts per million. Where the fluorine content cannot be reduced sufficiently by this method, it will therefore be found economical and expedient in many cases to treat the water first with lime (or lime and soda) to obtain the combined advantages of softening and partial fluorine removal, and then treat the softened water further (preferably after "recarbonation") in a bed of tricalcium phosphate in the manner described. In the case of such combination treating plants, when it is desired to recover lime for further use in the water purification process, it should be borne in mind that this lime should be as free as possible of fluorine, in order to avoid subsequent reintroduction into the water; in other words, the precipitate of calcium carbonate from which the lime is obtained should be as free as possible from magnesium hydroxide. Accordingly, in such cases, we prefer to divide the lime treatment into two stages. In the first stage, lime is added in an amount short of that required to precipitate any appreciable amount of magnesium—that is, in an amount which will produce in the treated water a pH of less than about 10.2; and in the second stage the remainder of the lime is added, to precipitate the magnesium as magnesium hydroxide, which is the active agent in removing fluorine. The use of this two-stage treatment therefore makes possible the recovery of a pure lime, substantially free both from magnesium and from fluorine; and in the calcination of this lime there may be recovered, of course, carbon dioxide which may be utilized for recarbonation of the softened water and for the regeneration of the tricalcium phosphate as previously described.

Many modifications of the invention as described herein will naturally occur to those skilled in the art. For example, other forms of tricalcium phosphate than the special material described in detail in the foregoing disclosure may be utilized, as may also other alkaline earth phosphates, such as trimagnesium phosphate. All such modifications and adaptations of the processes which have been described are contemplated within the scope of the invention as defined in the appended claims.

We claim:

1. A process for removing fluorine from water which comprises contacting the water with a water-insoluble alkaline earth phosphate of the class consisting of tricalcium phosphate and trimagnesium phosphate, regenerating the spent phosphate with a solution of an alkali, and subsequently contacting the phosphate with carbon dioxide.

2. A process for removing fluorine from water which comprises passing the water through a bed of granular tricalcium phosphate until the latter is substantially exhausted, regenerating the spent calcium phosphate with a solution of an alkali, and contacting the phosphate with carbon dioxide.

3. A process for removing fluorine from water which comprises passing the water through a bed of granular tricalcium phosphate until the latter is substantially exhausted, backwashing the bed with water, passing through the bed a solution of sodium hydroxide, removing some of the excess alkali by washing with water, contacting the bed with carbon dioxide, and again washing with water.

4. A process according to claim 3, in which the carbon dioxide is employed in an aqueous solution.

5. A process according to claim 3, in which the carbon dioxide is bubbled upward through the bed of tricalcium phosphate.

6. A process for removing fluorine from a hard, magnesium-containing water which comprises removing part of the fluorine by treating the water with lime to precipitate magnesium hydroxide, and subsequently removing a further portion of the fluorine by contacting the treated water with tricalcium phosphate which has been regenerated with the solution of an alkali and subsequently contacted with carbon dioxide.

7. A process according to claim 6 in which the water after lime treatment is recarbonated with carbon dioxide before being contacted with tricalcium phosphate.

8. A process according to claim 6, in which the lime treatment is conducted in two stages, in the first of which lime is added in quantities sufficient to precipitate substantially pure calcium carbonate unmixed with any appreciable amount of magnesium, and in the second of which a further quantity of lime is added in amount sufficient to accomplish substantially complete precipitation of the magnesium hydroxide, the calcium carbonate precipitated in the first stage being recovered and calcined to provide lime which is used for treating a further portion of the water.

9. A process for regenerating tricalcium phosphate which has been utilized for removing fluorine from water which comprises treating the tricalcium phosphate with a solution of an alkali, and subsequently with carbon dioxide.

10. A process for regenerating a bed of tricalcium phosphate which has been utilized for removing fluorine from water which comprises treating the bed in turn with a solution of sodium hydroxide, with water, with carbon dioxide, and again with water.

11. A process for removing fluorine from water which comprises contacting the water with a water-insoluble material consisting essentially of an alkaline earth phosphate selected from the class consisting of tricalcium phosphates and trimagnesium phosphates, regenerating the spent phosphate with a solution of an alkali, and subsequently contacting the phosphate with carbon dioxide.

ABRAHAM SIDNEY BEHRMAN.
HILDING B. GUSTAFSON.